United States Patent [19]

Hilton

[11] 4,352,648

[45] Oct. 5, 1982

[54] POWDERED METAL PRESS AND TOOLING THEREFOR

[75] Inventor: Carl W. Hilton, Muskegon, Mich.

[73] Assignee: Toolmakers, Incorporated, Muskegon, Mich.

[21] Appl. No.: 218,657

[22] Filed: Dec. 22, 1980

[51] Int. Cl.$^3$ .............................................. B29C 3/00

[52] U.S. Cl. ...................................... 425/78; 425/345

[58] Field of Search ................................. 425/78, 345

[56] References Cited

U.S. PATENT DOCUMENTS

| | | | |
|---|---|---|---|
| 1,648,721 | 4/1927 | Claus | 264/319 |
| 1,820,235 | 8/1931 | Lemming et al. | 425/78 |
| 2,338,491 | 1/1944 | Cutler | 18/16 |
| 2,499,980 | 3/1950 | Stokes, Jr. et al. | 18/16 |
| 2,762,078 | 11/1956 | Haller | 18/16.5 |
| 3,123,379 | 3/1964 | Crane | 18/16.5 |
| 3,172,156 | 3/1965 | Belden | 18/16.7 |
| 3,200,442 | 8/1965 | Haller | 18/16.5 |
| 3,353,215 | 11/1967 | Haller | 18/16.7 |
| 3,394,432 | 7/1968 | Laurent | 425/78 |
| 3,868,201 | 2/1975 | Jacobson et al. | 425/78 |
| 3,909,167 | 9/1975 | Signora | 425/78 |
| 3,972,670 | 8/1976 | Henkel | 425/355 |
| 4,057,381 | 11/1977 | Korsch | 425/345 |

*Primary Examiner*—Thomas P. Pavelko

*Attorney, Agent, or Firm*—Price, Heneveld, Huizenga & Cooper

[57] ABSTRACT

A lower punch assembly for use in a rotary table, powdered metal compacting press includes a punch shank defining a cam follower, a core rod disposed within the shank, and a mounting assembly for mounting the shank to the press and permitting the shank to rotate with respect to a vertical axis of the shank. In one embodiment, the mounting assembly includes a bearing member from which a plurality of hanger rods extend. The shank is slidably mounted on the hanger rods. The core rod is engaged by a spring and is connected to the shank so that it will withdraw or extend during an ejection stroke to reduce ejection loading.

26 Claims, 15 Drawing Figures

POWDERED METAL PRESS AND TOOLING THEREFOR

BACKGROUND OF THE INVENTION

The present invention relates to powdered metal compacting presses and more particularly to a lower punch assembly or tooling for rotary table compacting presses.

A wide variety of small, metal parts are made employing powder metallurgy techniques. Powder metallurgy, basically, involves the production of metal powders which are consolidated to a desired density, shape and cohesion to form a part. The part is subsequently subjected to a heating process known as sintering. Sintering may involve the formation of liquid phase or may be carried out below the melting point of all the metal powder constitutents. Powder metallurgy permits the fabrication of refractory or reactive metals, provides for the homogeneous combination of dissimilar materials and permits the production of metal parts of controlled porosity or permeability. Powder metallurgy also permits the production of large numbers of small parts at significantly lower cost when compared to other conventional techniques, such as casting, forging or machining. Typically, the maximum weight of a part which may be made by powder metallurgy techniques is on the order of one pound. Parts may be fabricated employing such techniques from copper, iron, steel, bronze and aluminum powders.

Various forms of compacting presses have been developed for use in powder metallurgy processes. Examples of such presses may be found in U.S. Pat. No. 2,762,078, entitled MOLDING PRESS WITH ADJUSTABLE CORE ROD and issued on Sept. 11, 1956, to Haller; U.S. Pat. No. 3,172,156, entitled COMPPACTING PRESS and issued on Mar. 9, 1965, to Belden; and U.S. Pat. No. 3,868,201, entitled POWDERED METAL PRESS and issued on Mar. 25, 1975, to Jacobson et al. The presses disclosed in these patents, basically, include a platen supporting a die cavity, a core rod, a lower punch sleeve and an upper ram which also supports a punch sleeve.

The press disclosed in the Haller patent includes a core rod secured to a piston which is disposed within a cylinder. The piston cylinder assembly is a double-acting arrangement, and fluid under pressure enters ports at each end of the cylinder. An accumulator supplies fluid to the cylinder. The press is operable so that the core piece will move downwardly during the compaction stroke when the upper punch is moved relative to the lower punch. During ejection, the lower punch and core piece are advanced upwardly.

The above presses all employ relatively movable platens and/or rams and punches which shift only about a vertical axis. Other forms of compacting presses have been developed which are generally referred to as rotary table presses. These presses employ generally circular upper and lower tables or die head assemblies which are positioned in a superimposed relationship. The head assemblies support a plurality of circumferentially positioned dies, lower punch assemblies and upper punch assemblies. As the tables are rotated about a vertical, central axis, the upper and lower punches are progressively moved towards each other to compact powder metal disposed within the die cavities. The punches are subsequently moved apart, and the parts are ejected after compaction. The upper and lower punch assemblies each include a shank member which defines a heel or cam follower surface. The follower surface engages a generally circular cam track or ramp-like structure. As the tables rotate, the cam track reciprocates the punches to achieve compaction and ejection.

When producing certain powder metal parts, such as sleeves or bushings, excessive ejection loads may be encountered. The metal, when compacted within the die cavity, is pressed against the core rod. During ejection, excessive frictional forces are generated as the lower punch sleeve is moved upwardly on the core rod to force the compressed metal parts out of the die cavity. Significant loads are imparted to the tooling which can reduce reliability and result in tooling failure. Also, the shank members of the tooling which are shifted vertically and to which the punches are secured are fixed in the table structure for vertical movement only. The heels slide on the cam track surface. At operating speeds, significant heat is generated, and the cam tracks and/or shank members are subject to extremely high wear. Typically, the cam tracks are fabricated from a bronze material. Such wear has an adverse effect on reliability and limits the number of parts which may be formed before the cam track and/or shank must be replaced.

A need exists for tooling adapted to rotary table machines whereby the ejection forces may be significantly reduced and/or whereby the high wear between the heel of the shank and the cam surface may be eliminated.

SUMMARY OF THE INVENTION

In accordance with the present invention, a unique lower punch assembly or tooling for a rotary table compacting press is provided whereby the aforementioned problems are substantially alleviated. Essentially, the tooling includes a punch shank defining an elongated bore. A core rod extends into the punch shank and is positioned generally coaxially therewith. Connecting means are provided for slidably connecting the shank to the core rod and a punch sleeve is secured to the shank. Vertical movement of the shank shifts the punch sleeve along the core rod. Provision is made for mounting the entire assembly to a metal compacting press and for permitting the punch shank to rotate about its vertical axis during rotation of the table. Rotation of the shank significantly reduces the wear occurring between the heel of the shank and the cam track surface.

In another aspect of the invention, the core rod is floatably supported by the punch shank so that it may move vertically with the punch sleeve during the ejection stroke to significantly reduce ejection loads. Once moved out of the die cavity, the part will expand circumferentially, thereby releasing the core rod which may shift within the shank bore back to an initial or start position.

In one embodiment, the shank and core rod are suspended from the table by a bearing means and a plurality of hanger or connecting rods. The shank may rotate about its vertical axis during rotation of the table. The core rod is floated within the shank by a resilient means engaging the lower end of the core rod. During ejection, the frictional forces cause the core rod to move vertically with the piece.

In another embodiment, usable to form parts where high frictional ejection loads are not encountered, the core rod and shank are interconnected so that the shank may move vertically with respect to the core rod. The rod, however, and shank are interconnected so that the shank may rotate about its vertical axis during rotation of the table. The cam follower surface or heel of the shank, therefore, may rotate as it slides along the cam track, thereby significantly reducing cam track and heel wear.

DETAILED DESCRIPTION OF THE PREFERRED EMBODIMENT

Figure 1:
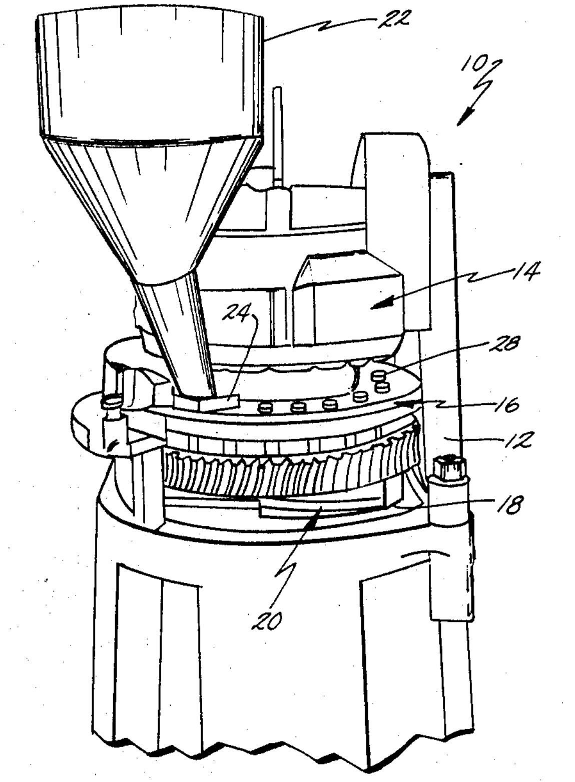
FIG. 1 is a fragmentary, perspective view of a rotary table compacting press for which the tooling in accordance with the present invention is adapted.

FIG. 1 illustrates a conventional, rotary table compacting press which is generally designated 10. The press 10 includes a frame structure 12 supporting an upper head assembly 14 on a lower head assembly 16. Frame 12 further defines a base 18 to which is secured an elongated, generally circular cam track 20. A hopper 22 is supported from frame 12 and includes a feed shoe or outlet 24. As is well-known in the art, lower head assembly 16 is rotated through a gear drive 26 and defines a plurality of die bores 28. Metal powder disposed in hopper 22 is directed to the dies positioned within bores 28 and compacted through coaction of an upper punch assembly and a lower punch assembly or tooling.

Figure 2:
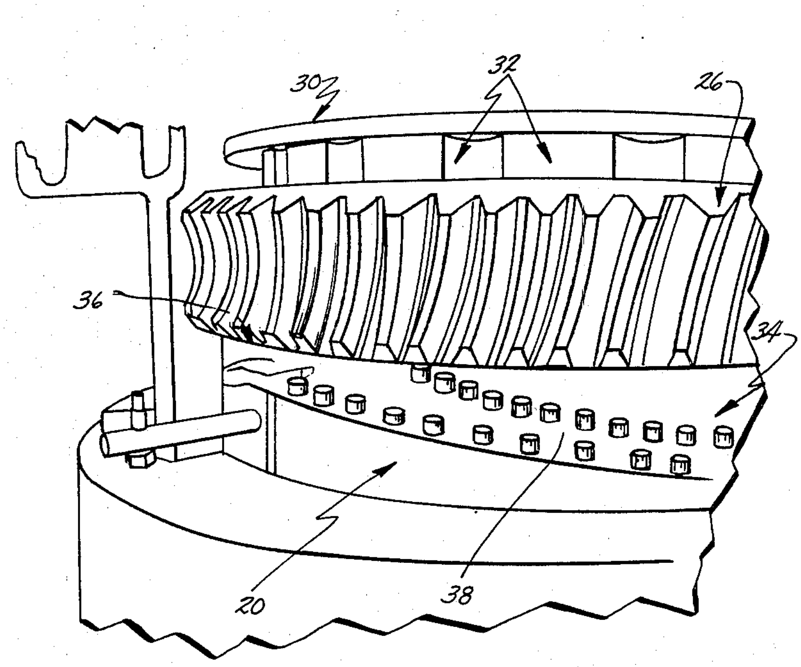
FIG. 2 is an enlarged, fragmentary view of the compacting press showing the rotary table drive and the cam track surface.

As seen in FIG. 2, lower table or head assembly 16 includes a bottom punch head portion 30 defining a plurality of circumferentially spaced, vertically extending bores 32. Disposed in juxtaposed relationship to the bores 32 is the cam track 20. Cam track 20 includes an upwardly inclined portion generally designated 34 and a downwardly inclined portion generally designated 36. Portions 34 and 36 define camming surfaces or tracks 38 adapted to engage the lower punch tooling.

Figure 3:
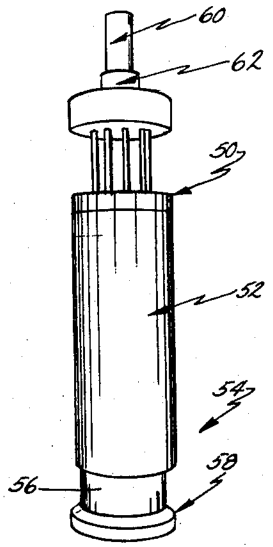
FIG. 3 is an elevational view of a lower punch assembly or tooling in accordance with the present invention.
Figure 4:
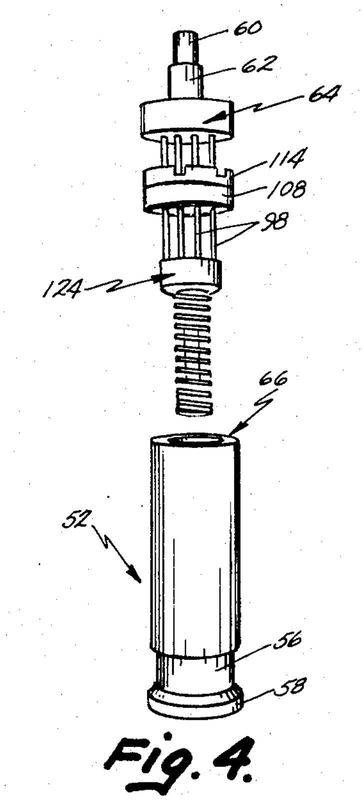
FIG. 4 is an exploded, elevational view of the tooling.
Figure 6:
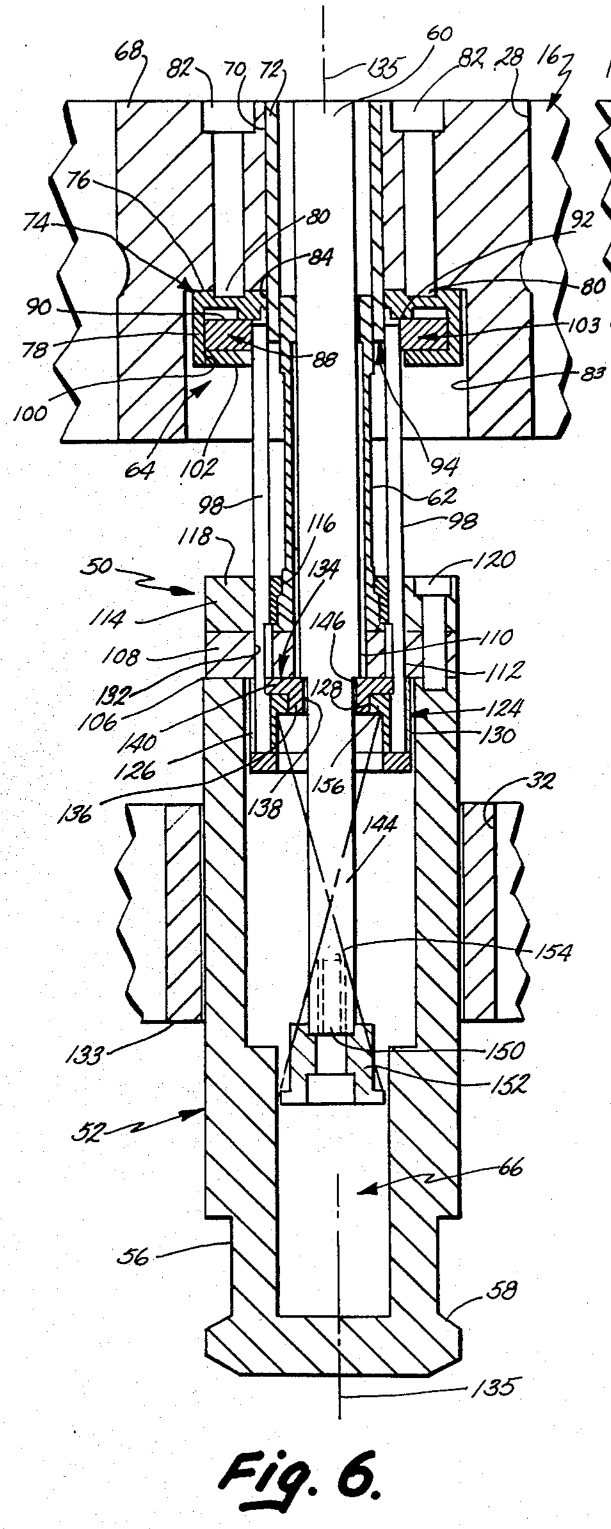
FIG. 6 is a vertical, cross-sectional view of the tooling mounted in the rotary table press.

A tooling assembly in accordance with the present invention is illustrated in FIGS. 3, 4 and 6 and generally designated 50. Tooling 50 includes a holder or punch shank 52 which is generally cylindrical in configuration. A lower end 54 of shank 52 defines a circumferential groove 56. Portion 54 terminates in an annular, circumferentially extending flange 58. Flange 58 is a heel or cam follower and which engages cam track 20. Tooling 50 further includes an elongated core rod 60, a punch 62 and mounting means 64.

Figure 5:
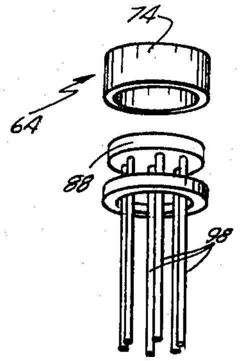
FIG. 5 is an exploded, elevational view of a bearing assembly and connecting rod or hanger means incorporated in the present invention.

As best seen in FIGS. 4, 5 and 6, shank 52 is generally cylindrical in configuration and defines an elongated bore or core rod chamber 66. Core rod 60 is coaxial with respect to bore 66. Shank 52 is interconnected with core rod 60 so that the shank may slide vertically with respect to the core rod. Mounting means 64 secures tooling 50 to a die case 68. Die case 68 is disposed within a bore 28 defined by the lower die head 16 (FIG. 6). Die case 68 defines a circular bore 70 within which is press fitted a die insert 72 of generally cylindrical configuration. Mounting means 64 includes an inverted, generally cup-shaped member or bearing collar 74 having a base 76 and peripheral sidewall 78. Base 76 is formed with a plurality of threaded bores 80 within which cap screws 82 are disposed. Cap screws 82 extend through suitable bores in the die case 68. As a result, screws 82 fix bearing collar 74 within a recess 83 defined by case 68. Base 76 of collar 74 defines a central, circular aperture 84 through which die insert 72, core rod 60 and lower punch 62 pass. Disposed within the confines of collar 74 is an annular ring-like member or inner bearing race 88. Race 88 defines an upper surface 90 which engages a plane bearing race or surface 92 defined by collar 74. Race 88 defines a central aperture 94. Secured to race 88 around a periphery of aperture 94 are a plurality of vertically extending connecting or hanger rods 98. Hanger rods 98 are equally spaced around the periphery of aperture 94. Rods 98 may be secured to inner race 90 by welding, silver brazing or other such conventional techniques. The inner peripheral surface of sidewall 78 is threaded adjacent its lower end 100 and a bearing cap 102 closes off the lower or open end of the cup-shaped member 74. Collar 74 and bearing cap 102 define a bearing chamber 103 which may be packed with a suitable lubricant. Race member 88 and, hence, connecting rods 98 may rotate with respect to collar 74 and die case 68.

Disposed on the upper end 106 of shank 52 is a lower punch base plate 108. Base plate 108 defines a centrally disposed aperture 110 and a plurality of rod apertures 112. A clamp ring 114 is positioned on top of base 108. Clamp ring 114 also defines a central aperture 116 and a plurality of rod apertures 118. Base plate 108 and ring 114 define a closure for the open end of shank 52. As is clear from FIG. 6, punch 62 is secured to base 108 by clamp ring 114. A plurality of cap screws 120 extend through suitable bores formed in ring 114 and base 108 into threaded bores formed in the upper end 106 of shank 52.

Each hanger rod 98 extends through its respective bore 112, 118 and into a rod housing generally designated 124. Rod housing 124 includes a generally annular housing member 126. Member 126 defines a central bore 128 and a plurality of rod receiving apertures 130. As seen in FIG. 6, each rod is formed with a longitudinally extending notch 132. The lower rod ends are secured to housing 124 by a flanged retainer 134. Retainer 134 includes a central hub portion 136 defining a central aperture 138 and a radially extending flange 140. Hub portion 138 is threaded into bore 128, and flange portion 140 extends into notches 132 of each of the hanger rods 98.

Core rod 60 is stepped in cross section, includes a lower, elongated portion 144 and defines a stop shoulder 146 (FIG. 6). As should be readily apparent, shank 52 may slide up and down on hanger rods 98. Further, rods 98 and shank 52 may rotate about a vertical axis 135 of the shank and the core rod 60.

Core rod 60 supports, at its lower end 150, a spring seat 152. A spring means 154 is interposed between spring seat 152 and a shoulder 156 defined by the rod housing member 126. In the preferred embodiment, spring means 154 is a coil spring (FIG. 4). Spring 154 biases the core rod 60 downwardly or into bore 66 to a normal position wherein the stop shoulder 146 engages an upper surface of the rod retainer ring 134.

A sleeve 133 is pressfit within bore 32 of bottom punch head portion 30 of table 16. Sleeve 133 is cylindrical in configuration and guides shank 52 as it reciprocates within bore 32.

As explained in detail below, the mounting means and interconnecting structure including the bearing assembly, hanger rods 98, rod retainer housing 124 and lower punch base plate 108 permit the punch shank 52 to be shifted vertically with respect to die case 68. Upon vertical, upward movement, punch 62 is shifted into the die cavity defined by the core rod and insert 72. Lower punch 62 in cooperation with an upper punch (not shown) will compact powder metal disposed in the die cavity. As heel 58 engages the cam track and is moved vertically, it may rotate with respect to the track about its vertical axis. This is achieved through the bearing assembly defined by the mounting means 64. During an ejection stroke, core rod 60 may extend along with punch 62 against the bias of spring 154 to thereby significantly reduce ejection loads.

ALTERNATIVE MOUNTING MEANS

Figure 7:
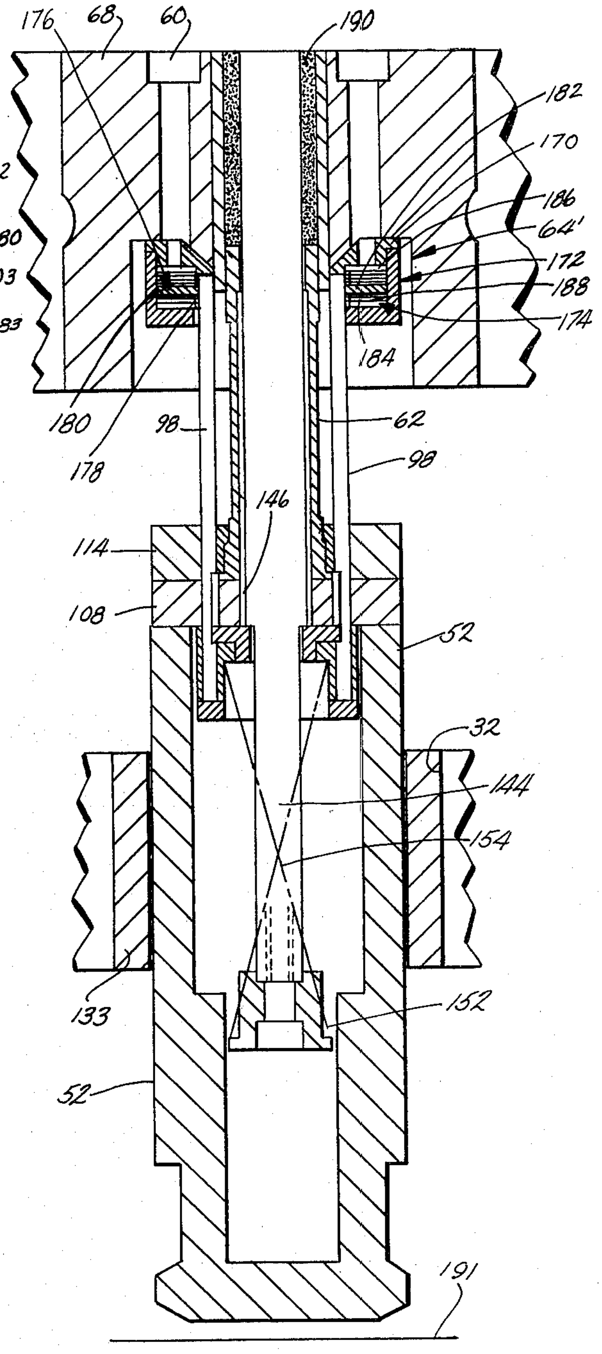
FIGS. 7–10 are fragmentary, vertical, cross-sectional views of the tooling illustrating an alternative bearing means and showing the sequence of operation of the tooling.

FIG. 7 illustrates the lower punch assembly in accordance with the present invention which includes an alternative mounting means generally designated 64'. Alternative mounting means 64' includes an upper race mounting base 170 threadably secured to a cup-shaped race collar 172. Race mounting base 170 and collar 172 define a race housing 174. Connecting rods or hanger rods 98 are secured to an inner raceway member 176 including a central hub 178 and an annular, radially extending flange 180. Flange 180 defines an upper race surface 182 and a lower race surface 184. A thrust race 186 engages an inner surface of mounting base 170 and a plurality of needle bearings 188 are positioned between thrust race 186 and upper surface 182. Also, a plurality of needle bearings 188 are positioned between lower surface 184 of the raceway and an inner surface of the race collar. It has been found that the needle bearing structure illustrated in FIG. 7 is not necessary for reliability. The mounting means having the plain bearing structure illustrated in FIG. 6 is more than adequate and is presently preferred.

OPERATION

Figure 8:
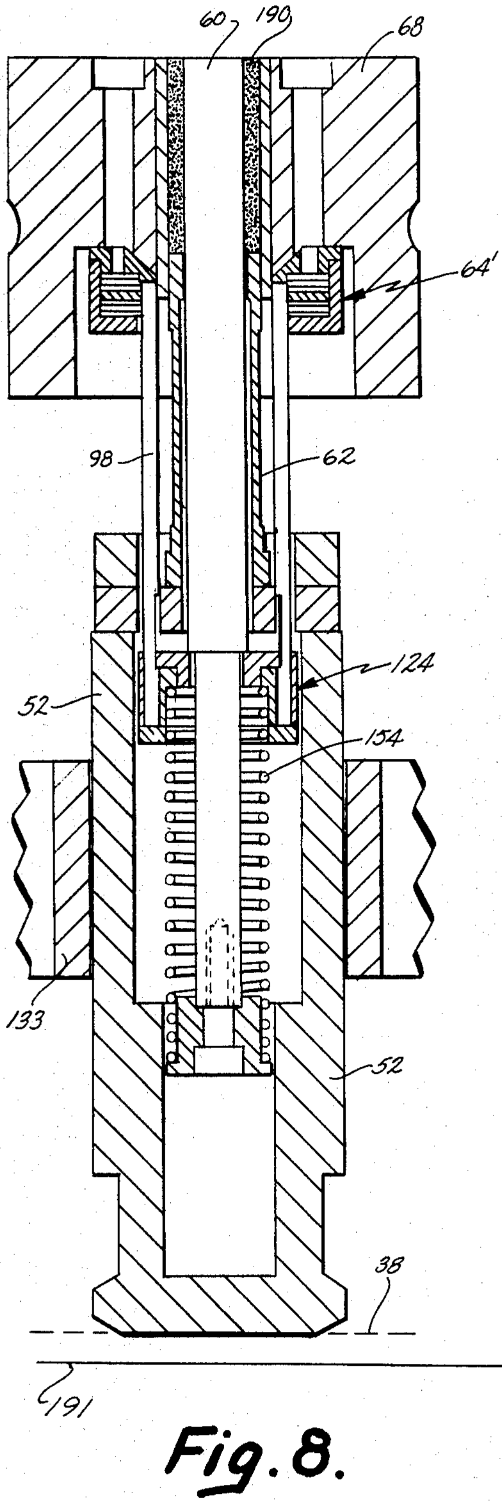
Figure 9:
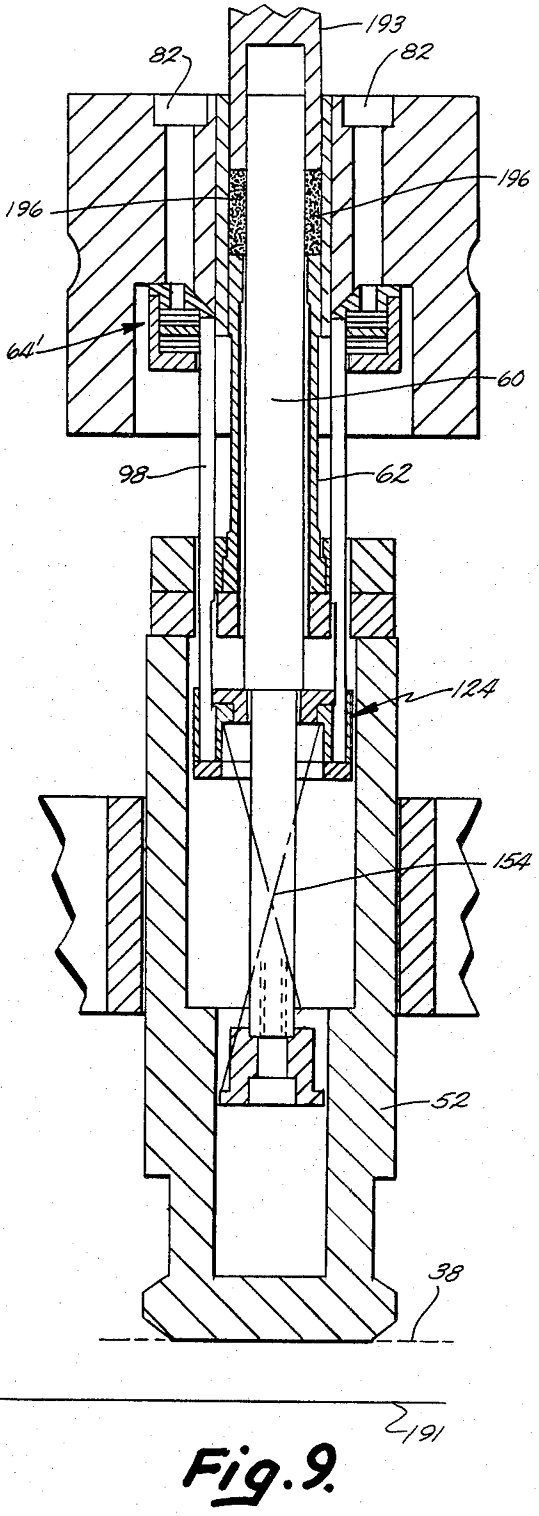

In use, a plurality of the lower punch assemblies 50 would be supported from the rotary table 16 within die bores 28. The sequence of operation of the tooling is illustrated in FIGS. 7–10. Initially, the die cavity defined by core rod 60 and die insert 72 is filled with a quantity of powdered metal generally designated 190. As schematically shown, the heel 58 is out of contact with cam surface 38, which is represented initially by datum line 191, and shank 52 is at its lowermost position. Base plate 108 is contacting an upper surface of the hanger rod housing 124. This is the "overfill" position of the tooling and a quantity of powdered metal 190 and greater than that actually required to form the part is deposited in the die cavity by hopper 22. As table 16 continues to rotate, heel 58 will come into contact with the cam surface 38, as shown in FIG. 8. The heel is raised vertically with respect to die case 68 and punch 62 moves up into the die cavity. This is an adjusted fill position of the tooling. Next, as shown in FIG. 9, shank 52 is further raised by cam surface 38 and punch 62 moves upwardly into the die cavity. Punch 62, in cooperation with an upper punch, schematically illustrated in FIG. 9 and generally designated 193, compacts the powdered metal to form a part generally designated 196.

Figure 10:
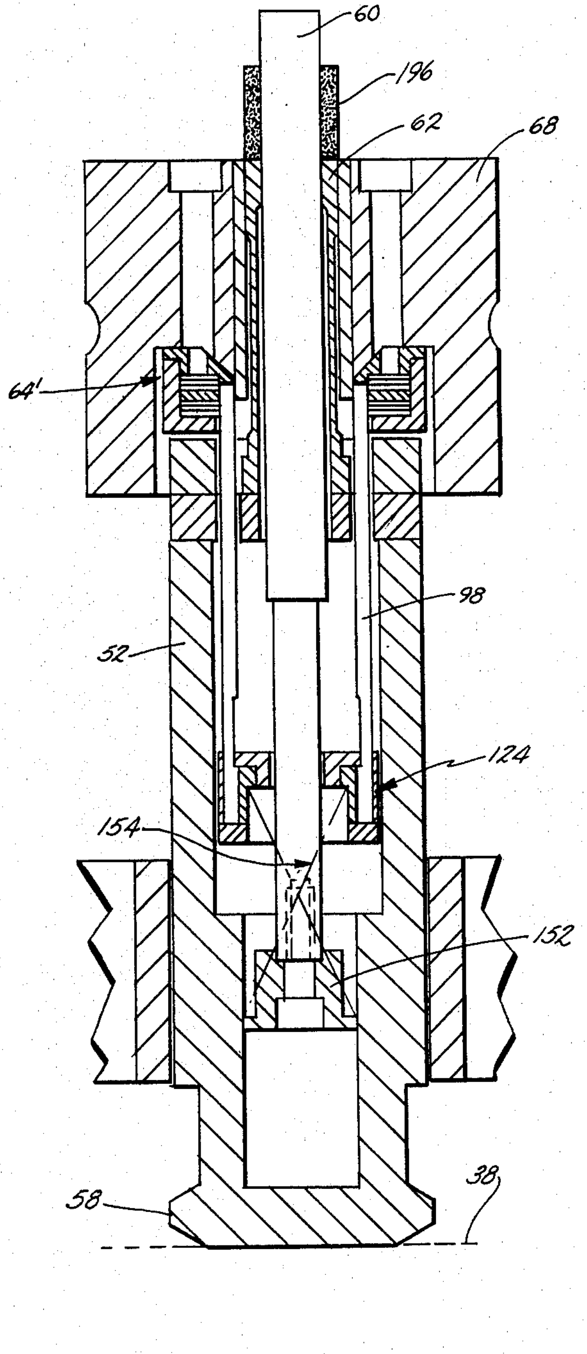

As illustrated in FIG. 10, heel 58 of shank 52 is further raised by the cam surface 38 to the ejection position. When ejecting the formed part 196, punch 62 is moved upwardly with shank 52 to a position level with the top surface of the die cavity 68. Significant frictional forces are present between part 196 and the core rod 60. Due to its "floating" interconnection with the shank 52, core rod 60 will extend or shift vertically upwardly with the part 196 and punch 62 against the bias of spring 154. Once the part 196 is moved above the top of die cavity 68, it will expand slightly, thereby releasing core rod 60. Rod 60 will return to its lower position within shank 52 under the bias of spring 154. Air trapped below spring seat 152 cushions the downward movement of the core rod within shank 52. After completing the ejection stroke, the flanged heel 58 engages a grooved portion 36 of cam track 20 and the shank is pulled downwardly to its initial or start position.

Mounting means 64 and mounting means 64' permit shank 52 to rotate about its central vertical axis as it slides in contact with cam track 20. This rotation significantly reduces the wear heretofore experienced between these two parts of the rotary die press. Loads and stresses on the tooling are reduced since the shank is free to rotate in response to any loading. Since core rod 60 is permitted to shift vertically with the completed piece during ejection, ejection loading is also significantly reduced. The tooling in accordance with the present invention significantly increases the reliability of the compacting press and insures a more uniform quality of compacted parts. These advantages are all achieved through the rotary mounting of the shank and the floating interconnection of the core rod to the shank.

ALTERNATIVE LOWER PUNCH TOOLING

Figure 11:
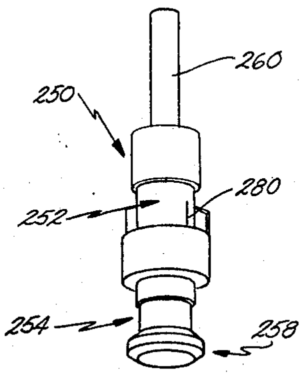
FIG. 11 is an elevational view of an alternative embodiment of a lower punch assembly or tooling in accordance with the present invention.
Figure 12:
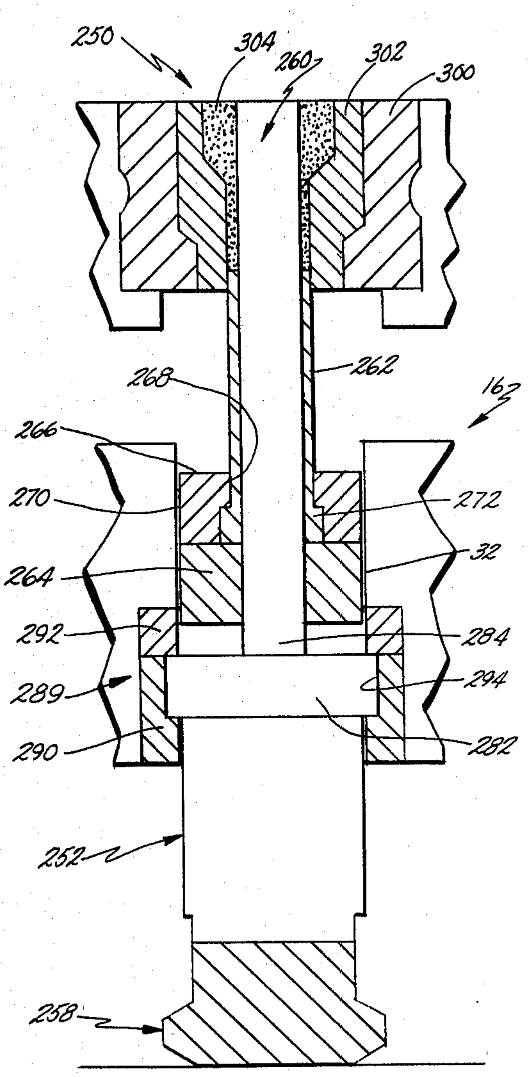
FIGS. 12–15 are fragmentary, vertical, elevational views in cross section of the tooling of FIG. 11 supported in a rotary table press and showing the sequence of operation of the tooling.

An alternative embodiment of a lower punch assembly or tooling in accordance with the present invention is illustrated in FIGS. 11 and 12 and generally designated 250. Tooling 250 is adapted to fabricate parts wherein the excessive frictional forces between the compacted part and the core rod are not experienced. Since these frictional forces are not present, the core rod need not extend during the ejection stroke. Embodiment 250, however, permits rotation of a punch shank with respect to a cam track to reduce wear between the shank and the cam.

Embodiment 250, as seen in FIGS. 11 and 12, includes an elongated shank 252 having a lower end 254 defining a cam follower or heel 258. As in embodiment 50, heel 258 rides on and is engaged by an elongated cam track. Tooling 250 further includes a core rod 260 and a generally cylindrical punch 262. Punch 262 is disposed around and coaxial with core rod 260. Punch 262 is mounted to shank 252 by a punch base plate 264 and a punch clamping ring 266. Base plate 264 defines a throughbore 268 which is undercut at 270 to receive a flange 272 defined by punch 262. Suitable fasteners, such as cap screws 274 (FIG. 14), secure clamp ring 266 and base plate 264 to the top 276 of shank 252.

Shank 252 defines opposed, vertically extending slots 280 which extend through the shank sidewall. A bridge piece 282 is secured to a lower end 284 of core rod 260. Piece 282 extends through slots 280 defined by shank 252. As seen in FIG. 12, tooling 250 is mounted to the rotary table 16 at bore 32 by mounting means 289. Means 289 includes a lower punch sleeve 290 and a punch sleeve cap 292. Sleeve 290 and cap 292 are disposed within bore 32 and define an annular shaped, inwardly opening circumferential groove 294. Groove 294 is dimensioned to rotatably receive bridge 282 which extends outwardly beyond slots 280 formed in shank 250. As should be readily apparent, bridge 282, core rod 260 and shank 252 may rotate about a vertical, central axis of the shank since bridge member 282 may rotate within groove 294. The lower punch sleeve, cap and bridge secure tooling 250 to the rotary table compacting press.

FIGS. 12–15 illustrate the operation of tooling 250 to form a rocker arm ball. Tooling 250 is supported on the rotary table so that the core 260 extends into a mold cavity defined by a die case 300 and die insert 302. FIG. 12 illustrates shank 252 at its lowermost position and in contact with the cam track surface. Powdered metal 304 has been deposited within the die cavity defined by insert 302 and core rod 260. The tooling is in its "overfill" position. In a presently existing embodiment of tooling 250, metal 304 is filled to a depth of 1.125 inches.

Figure 13:
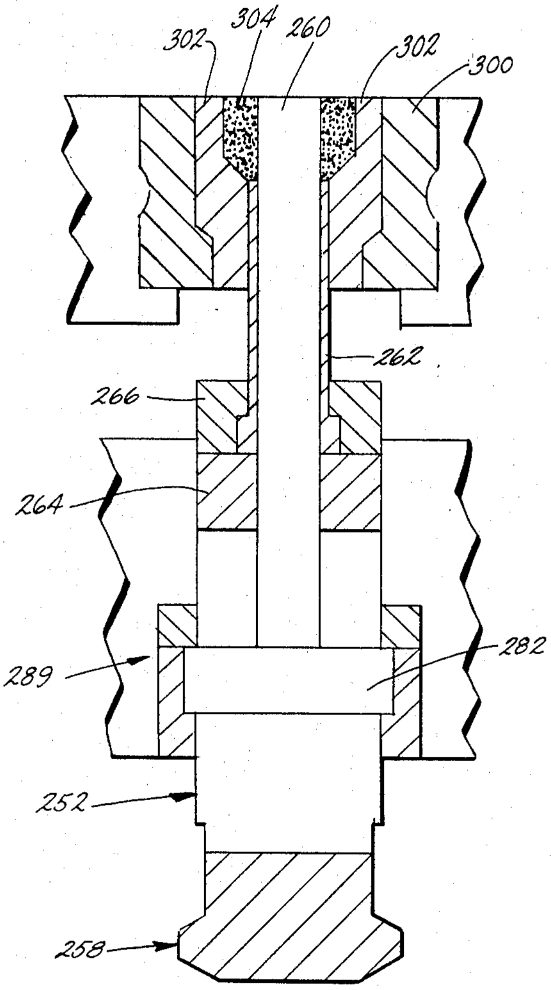

FIG. 13 illustrates the shank 252 and punch 262 moved upwardly on core rod 260 to an adjusted fill position. In such existing embodiment, the cavity depth is reduced to 0.535 inches.

Figure 14:
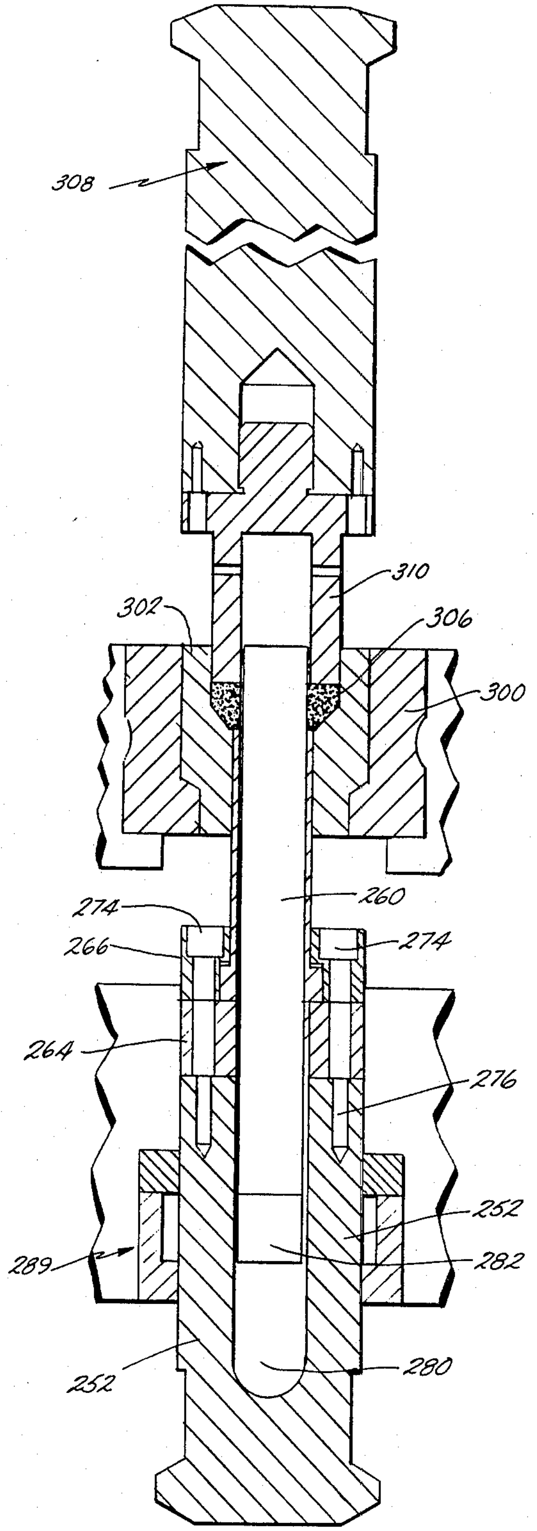

In FIG. 14, compaction of the powdered metal 304 is taking place to form the finished rocker arm ball, generally designated 306. An upper punch assembly generally designated 308 has been moved downwardly by upper head assembly 14 so that a punch 310 has entered the die cavity. The metal is compacted to a mean part thickness of 0.303 inches in the presently existing embodiment. As is clear from a comparison of FIGS. 13 and 14, shank 252 and core rod 260 have rotated and are permitted to rotate with respect to die case 300.

Figure 15:
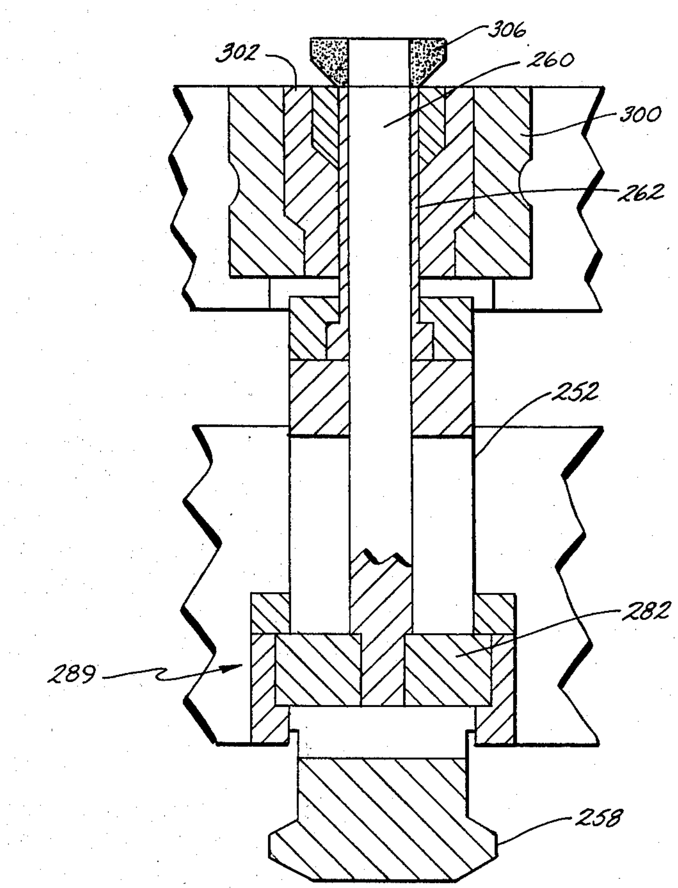

FIG. 15 illustrates the positioning of the tooling during the ejection stroke. Shank 252 has been moved upwardly by the cam surface until the punch 262 is even with the top surface of the die case 300. This pushes the completed part 306 up above the top surface of the lower rotary table. After ejection of the part, the cam track, as described above, pulls shank 252 back downwardly to its initial or start position and the compaction cycle may be repeated.

The frictional forces caused by compaction of the powdered metal within the die cavity in the embodiments of FIGS. 11–15 are not very great and extension of the core rod is not necessary. The embodiment 250, however, provides the same advantages from rotation of the shank thereby reducing shank-cam track wear. In tooling heretofore provided for rotary compacting presses, a rigid bridge piece has been provided and the core rod has in effect been bolted in position with respect to the rotary table. As a result, the core rod and/or the shank or tool holder 250 were not permitted to rotate with respect to the table. Problems with respect to excessive wear are solved by tooling in accordance with the present invention.

In view of the foregoing description, those of ordinary skill in the art will undoubtedly envision various modifications which would not depart from the inventive concepts disclosed herein. For example, with embodiment 50, spring means other than the coil spring illustrated could be used to bias the core rod to its initial or compaction position. Further, a greater or lesser number of hanger rods could undoubtedly be used. A primary concern is the mounting of the tool so that the shank or tool holder is permitted to rotate about its vertical axis as it moves in contact with the camming surface. Further, with embodiment 50, the additional concept of floating the core rod to reduce extraction loads is incorporated. Therefore, it is expressly intended that the above description should be considered as that of the preferred embodiment. The true spirit and scope of the present invention may be determined by reference to the appended claims.

The embodiments of the invention in which an exclusive property or privilege is claimed are defined as follows:

1. A lower punch assembly for use with a metal compacting press to form compacted metal parts, said assembly comprising:
- a punch shank having a lower heel adapted to be engaged by a cam, said shank defining a bore having a vertical axis;
- a core rod extending into said punch shank and being coaxial therewith;
- connecting means for slidably connecting said shank to said core rod so that said shank may slide up and down on said core rod; and
- mounting means engaging said shank for mounting said assembly to a metal compacting press and for permitting said punch shank to rotate about said vertical axis.

2. A lower punch assembly as defined by claim 1 wherein said connecting means includes means for permitting said core rod to move vertically with respect to said punch shank along with a compacted metal part during ejection of the compacted metal part to reduce ejection forces and to withdraw back into said punch shank after ejection of a part.

3. A lower punch assembly as defined by claim 2 wherein said mounting means comprises:
- a bearing means including a bearing element connected to said punch shank.

4. A lower punch assembly as defined by claim 3 wherein said bearing means comprises:
- a bearing housing defining a chamber;
- a generally annular member defining said bearing element and having upper and lower inner raceways, said annular member being disposed within said chamber;
- a plurality of bearing elements engaging said bearing housing and the raceways of said annular member;
- a plurality of elongated connecting rods, each connecting rod having an end secured to said annular member;
- a connecting rod housing disposed within said punch shank, each connecting rod having another end secured to said connecting rod housing; and
- a punch shank base secured to said punch shank and defining a plurality of throughbores, each connecting rod extending through one of said throughbores, said base and said punch shank defining a core rod chamber within which said connecting rod housing is disposed.

5. A lower punch assembly as defined by claim 4 wherein said means for permitting said core rod to move vertically comprises:

a spring seat secured to said core rod; and spring means engaging said connecting rod housing and said spring seat for biasing said core rod into said punch shank, said core rod moving vertically with respect to said shank during ejection against the bias of said spring means.

6. A lower punch assembly is defined by claim 5 further including a generally cylindrical, elongated punch, said core rod extending through said punch and said punch being connected to said shank so that said punch moves up and down on said core rod as said punch shank moves with respect to said core rod.

7. A lower punch assembly as defined by claim 3 wherein said bearing means comprises:

a bearing housing defining a first bearing surface, said bearing element defining a second bearing surface slidably engaging said housing bearing surface;

a plurality of connecting rods, each connecting rod having an end secured to said bearing element; and connecting rod housing means for interconnecting another end of each of said connecting rods to said shank so that said shank, said rods and said bearing element can rotate with respect to said bearing housing.

8. A lower punch assembly as defined by claim 4 wherein said means for permitting said core rod to move vertically comprises:

a spring seat secured to said core rod; and spring means engaging said connecting rod housing means and said spring seat for biasing said core rod into said punch shank, said core rod moving vertically with respect to said shank during ejection against the bias of said spring means.

9. A lower punch assembly as defined by claim 8 further including a generally cylindrical, elongated punch, said core rod extending through said punch and said punch being connected to said shank so that said punch moves up and down on said core rod as said punch shank moves with respect to said core rod.

10. A lower punch assembly as defined by claim 1 wherein said punch shank defined a pair of opposed, vertically extending slots and wherein said mounting means comprises:

a generally cup-shaped lower punch sleeve having a central aperture within which said punch shank is disposed, said punch sleeve defining a circumferential groove opening towards said punch shank; and a bridge member extending through said slots and having ends disposed within said groove.

11. A lower punch assembly as defined by claim 10 further including a base secured to an upper end of said shank and defining a central aperture through which said core rod extends into said punch shank.

12. A lower punch assembly as defined by claim 9 further including a generally cylindrical, elongated punch, said core rod extending through said punch and said punch being connected to said shank so that said punch moves up and down on said core rod as said punch shank moves with respect to said core rod.

13. A lower compacting tool for use with a complementary upper tool assembly for compacting powder metal within a die cavity defined by a die case, said tool comprising:

an elongated punch shank having an open top and defining a bore;

a closure secured to said open top and having a central aperture;

an elongated, generally cylindrical core rod extending through said central aperture and having a lower end disposed within said punch shank bore;

a generally cylindrical punch disposed around said core rod and having a lower end secured to said closure, said punch shank and said punch being movable vertically along said core rod; and core rod withdrawal means engaging said core rod for permitting said core rod to extend vertically with said punch and said punch shank during an ejection stroke to reduce ejection loads, said core rod withdrawal means including a seat secured to the lower end of said core rod and a spring having an end engaging said seat so that said core rod extends with said punch against the bais of said spring during the ejection stroke.

14. A lower compacting tool as defined by claim 13 further including:

mounting means supporting said punch shank for mounting said tool in a position coaxial with the die case.

15. A lower compacting tool as defined by claim 14 wherein said mounting means includes means for permitting said punch shank to rotate about a vertical axis with respect to the die case.

16. A lower compacting tool for use with a complementary upper tool assembly for compacting powder metal within a die cavity defined by a die case, said tool comprising:

an elongated punch shank having an open top and defining a bore;

a closure secured to said open top and having a central aperture;

an elongated, generally cylindrical core rod extending through said central aperture and having a lower end disposed within said punch shank bore;

a generally cylindrical punch disposed around said core rod and having a lower end secured to said closure, said punch shank and said punch being movable vertically along said core rod;

core rod withdrawal means engaging said core rod for permitting said core rod to extend vertically with said punch during an ejection stroke to reduce ejection loads; and mounting means adapted to suspend said punch shank from a die case, said mounting means comprising:

a bearing assembly including a rotatable race member extending around said core rod;

a plurality of vertically extending hanger rods, each having an end secured to said race member, said hanger rods extending through apertures defined by said closure and into said punch shank bore; and a hanger rod retainer housing disposed within said bore and encircling said core rod, each of said hanger rods being secured to said rod retainer housing whereby said punch shank can rotate about a vertical axis.

17. A lower compacting tool as defined by claim 16 wherein said core rod withdrawal means comprises:

a seat member secured to a lower end of said core rod within said shank bore; and spring means disposed between said seat member and said rod retainer housing for biasing said core rod into said bore, said core rod including a stop engaging an upper surface of said rod retainer.

18. A lower compacting tool as defined by claim 16 wherein said rod retainer housing comprises:

a generally cylindrical member having a sidewall and a central bore, each of said hanger rods being secured to said sidewall; and a rod retainer member including a hub portion threaded into said cylindrical member central bore, and an annular flange, each hanger rod including a notch and said flange extending into said notch.

19. A lower compacting tool as defined by claim 18 wherein said bearing assembly further includes a housing member within which said rotatable race member is disposed, said housing member adapted to be supported from the die case.

20. A lower compacting tool as defined by claim 19 wherein said housing member defines an annular, plain bearing surface engaging said race member.

21. A lower compacting tool as defined by claim 19 wherein said race member defines upper and lower race surfaces and said bearing assembly further includes a plurality of bearing elements rotatably engaging said race surface and said housing.

22. A lower punch assembly for use in a rotary die compacting press of the type including a rotating upper punch head, a rotating lower assembly including a die head and a lower punch head and a cam track, said lower punch assembly adapted to be supported by said rotating lower assembly and engaged by said cam track to compress a powder material in conjunction with said rotating upper punch head, said lower punch assembly comprising:

a tool holder having a cylindrical sidewall defining a vertical axis and a lower heel adapted to be engaged by the cam track;

a core rod extending into said holder along said vertical axis;

a generally cylindrical punch disposed around said core rod and secured to said holder for vertical movement therewith; and mounting means engaging said punch sleeve for securing said holder to said rotating lower assembly and for permitting said holder to rotate about said vertical axis whereby said heel of the holder may rotate with respect to said cam to reduce cam and heel wear.

23. A lower punch assembly as defined by claim 22 wherein said mounting means comprises:

a bearing housing defining a first bearing surface, said bearing element defining a second bearing surface slidably engaging said housing bearing surface;

a plurality of connecting rods, each connecting rod having an end secured to said bearing element; and connecting rod housing means for interconnecting another end of each of said connecting rods to said holder so that said holder, said rods and said bearing element can rotate with respect to said bearing housing.

24. A lower punch assembly as defined by claim 23 further including means for permitting said core rod to withdraw from said tool holder during an ejection stroke, said means comprising:

a spring seat secured to said core rod; and spring means engaging said connecting rod housing means and said spring seat for biasing said core rod into said tool holder, said core rod moving vertically with respect to said tool holder during ejection against the bias of said spring means.

25. A lower punch assembly as defined by claim 22 wherein said tool holder defines a pair of opposed, vertically extending slots and wherein said mounting means comprises:

a generally cup-shaped lower punch sleeve having a central aperture within which said tool holder is disposed, said punch sleeve defining a circumferential groove opening towards said tool holder; and a bridge member extending through said slots and having ends disposed within said groove.

26. A lower punch assembly as defined by claim 25 further including a base secured to an upper end of said tool holder and defining a central aperture through which said core rod extends into said tool holder.

* * * * *

UNITED STATES PATENT AND TRADEMARK OFFICE

CERTIFICATE OF CORRECTION

PATENT NO. : 4,352,648

DATED : October 5, 1982

INVENTOR(S) : Carl W. Hilton

It is certified that error appears in the above-identified patent and that said Letters Patent is hereby corrected as shown below:

Column 8, line 11, "tool" should read -- tooling --.

Column 9, Claim 8, line 1,"claim 4" should read -- claim 7 --.

Column 9, Claim 12, line 1, "claim 9" should read -- claim 11 --.

Signed and Sealed this

*Twenty-third* Day of *October 1984*

[SEAL]

*Attest:*

GERALD J. MOSSINGHOFF

*Attesting Officer* *Commissioner of Patents and Trademarks*